United States Patent [19]

Suzuki et al.

[11] Patent Number: 4,469,264

[45] Date of Patent: Sep. 4, 1984

[54] TRACTOR APPARATUS FOR FEEDING PAPER

[75] Inventors: Teruo Suzuki; Tsuneki Kobayashi; Masao Miyasaka, all of Ibaraki, Japan

[73] Assignee: Hitachi Koki Co., Ltd., Tokyo, Japan

[21] Appl. No.: 472,825

[22] Filed: Mar. 7, 1983

[30] Foreign Application Priority Data

Mar. 12, 1982 [JP] Japan .................................. 57-39674

[51] Int. Cl.³ .......................... G03B 1/30; B65H 17/34

[52] U.S. Cl. ....................................... 226/74; 226/170

[58] Field of Search ........................ 226/74, 75, 76, 81, 226/170, 172; 400/616, 616.1, 616.2; 474/168-170, 202-205

[56] References Cited

U.S. PATENT DOCUMENTS 3,930,601 1/1976 Masuda .................................. 226/74

4,130,230 12/1978 Seitz ...................................... 226/75

FOREIGN PATENT DOCUMENTS 557772 5/1958 Canada .................................. 226/74

*Primary Examiner*—Leonard D. Christian

*Attorney, Agent, or Firm*—Sughrue, Mion, Zinn, Macpeak and Seas

[57] ABSTRACT

An apparatus for feeding a paper having holes utilizes an endless belt which contains a plurality of pins which are mounted so that they are positioned to a side of an outer periphery of the endless belt. The pins fit into holes in the paper to feed the paper as the endless belt is driven by two main pulleys. An auxiliary pulley is rotatably mounted on one of the shafts which supports one of the main pulleys in such a manner that the auxiliary pulley confronts and supports the bottoms of the pins, thus preventing the pins from being deflected inward. Because the auxiliary pulley is driven with one of the main pulleys, friction between the bottoms of the pins and the auxiliary pulley is minimized.

5 Claims, 9 Drawing Figures

TRACTOR APPARATUS FOR FEEDING PAPER

BACKGROUND OF THE INVENTION

1. Field of the Invention

The present invention relates to an apparatus for feeding paper in a stable manner.

2. Description of the Prior Art

As shown in FIGS. 1 and 2, and apparatus for feeding paper which has holes 12 includes a timing belt 2 which is disposed over a driving pulley 3 and a driven pulley 4. The pulleys 3, 4 are mounted on shafts which are fixed to a tractor frame 6, and pins 1 are mounted on the timing belt 2 so that they are not positioned on the outer periphery of the belt 2. The pins 1 fit into the holes 12 of the paper 11 in order to feed the paper 11. However, the feeding of the paper 11 is generally delayed by friction which is generated in the paper path and which is formed by a paper guide 7 and a tractor cover 9. As a result, the pins 1 are pushed inward due to the rigidity of the paper 11 when the pins 1 begin to fit into the holes 12, as shown in FIGS. 3 and 4. Hence, the pins 1 do not fit well into the holes 12, which causes jamming of the paper. Paper jamming creates numerous inconveniences because it is impossible to feed the paper in a stable manner if it constantly jams.

To solve these problems, an apparatus like that disclosed in U. S. Pat. No. 3,606,122, and illustrated generally in FIGS. 5 and 6, has been proposed. In this apparatus, the tractor frame 6 is extended so that it confronts and supports the bottom of the pins 1, as shown in FIG. 6. Accordingly, the tractor frame extension prevents the pins 1 from being pushed inward by the paper 11. The paper 11 is lifted by the reaction force of the pins 1 and regulated by the tractor cover 9 so that the pins 1 fit firmly into the holes 12.

However, because the bottoms of the pins 1 constantly come into contact with the tractor frame 6, a large frictional force is generated between the pin bottoms and the tractor frame 6 so that the pins 1 are delayed with respect to the pitch advance of the holes 12. As a result, the pins 1 eat into portions of the paper 11 other than the holes 2. If the paper 11 is weak-waisted, the paper 11 is torn, thereby making it impossible to feed the paper regularly. If the paper 11 is what is called "multi-paper" or the like, in which a copying paper is inserted between papers, and if the paper is also strong-waisted, should corresponding holes 12 of the paper be misaligned, the pins 1 are unable to fit into the holes 12. This results in a locked state in which the paper 11 floats and idles if the driving force of the tractor is strong.

SUMMARY OF THE INVENTION

The object of the present invention is to remove the above-mentioned drawbacks and provide a paper feeding apparatus which prevents the pins from being pushed inward and which also prevents a pitch lag from being generated by frictional forces.

In accordance with the present invention, an auxiliary pulley is mounted on a shaft of either a driving or driven pulley, and the auxiliary pulley confronts the pins and prevents them from being pushed inward by the paper. The auxiliary pulley is rotated with the driving or driven pulley in the same direction as that of the pins while supporting the bottoms of the pins, thus eliminating, or at least minimizing, frictional forces which are generated between the pin bottoms and the auxiliarly pulley.

DESCRIPTION OF THE PREFERRED EMBODIMENTS

Figure 1:
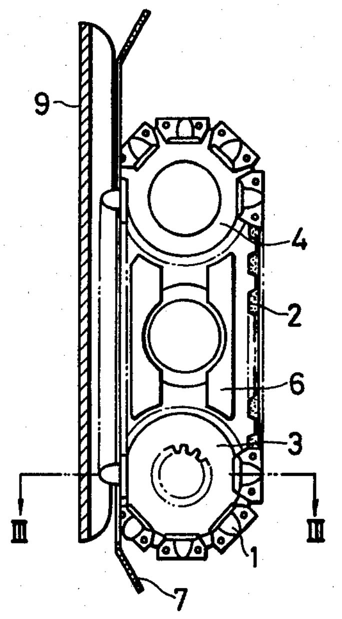
FIG. 1 (PRIOR ART)
FIG. 1 is a side elevation view showing one example of a conventional apparatus.
Figure 2:
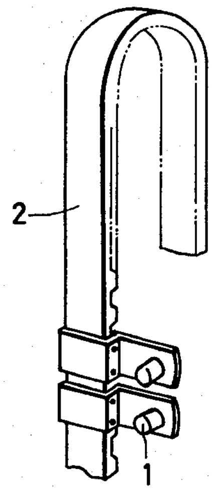
FIG. 2 (PRIOR ART)
FIG. 2 is a perspective view showing the relationship between a timing belt and the pins.
Figure 3:
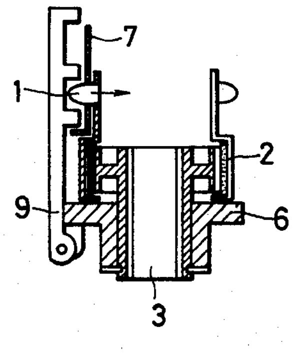
FIG. 3 (PRIOR ART)
FIG. 3 is a cross-sectional view taken along line III—III of FIG. 1.
Figure 4:
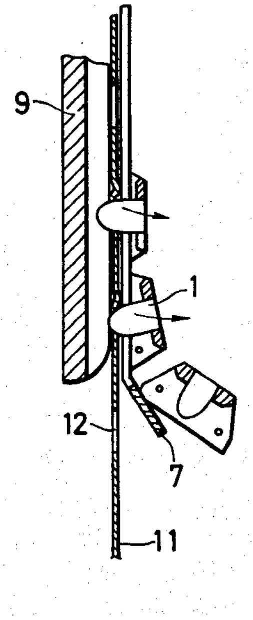
FIG. 4 (PRIOR ART)
FIG. 4 is a cross-sectional view showing the esssential parts of FIGS. 3.
Figure 5:
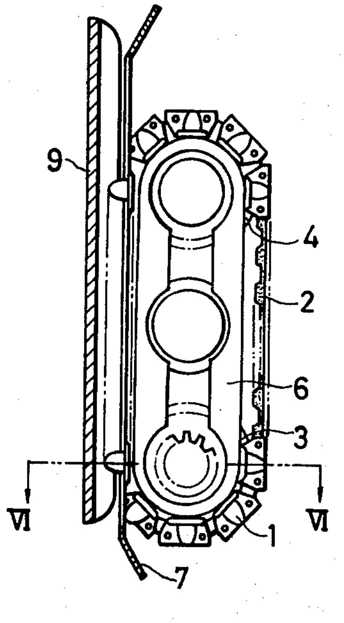
FIG. 5 (PRIOR ART)
FIG. 5 is a side elevation view showing another example of a conventional apparatus.
Figure 6:
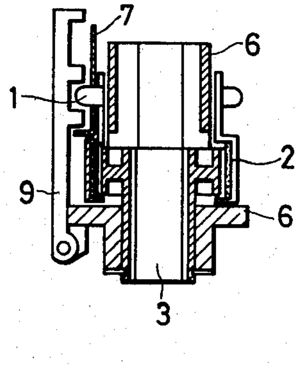
FIG. 6 (PRIOR ART)
FIG. 6 is a cross-sectional view taken along line VI—VI of FIG. 5.
Figure 7:
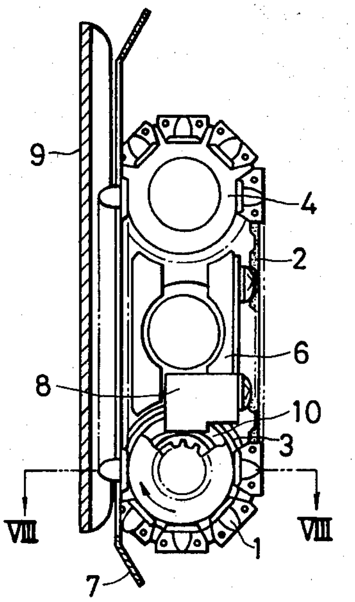
FIG. 7 is a side elevation view showing one embodiment of the apparatus of the present invention.
Figure 8:
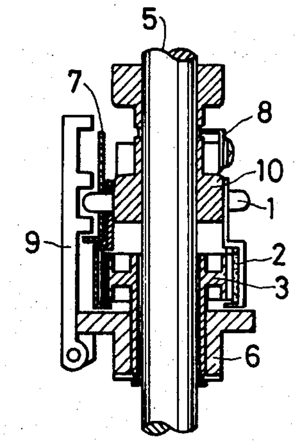
FIG. 8 is a cross-sectional view taken along line VIII—VIII of FIG. 7.
Figure 9:
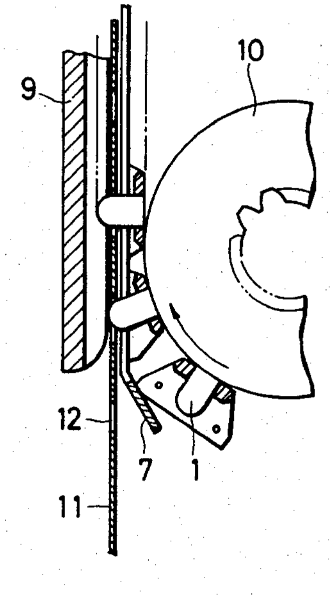
FIG. 9 is a cross-sectional view showing the essential parts of FIG. 7.

An embodiment of the present invention will be explained with reference to FIGS. 7–9. In this embodiment, a driving pulley 3 drives a timing belt 2 which has the above-mentioned pins 1 mounted on it, and the driving pulley 3 is mounted on a driving shaft 5 which is connected to a driving means (not shown) for feeding a paper 11. An auxiliary pulley 10, which constitutes the essential part of the present invention, is mounted on the driving shaft 5 in the same manner as the above-mentioned driving pulley 3, and the auxiliary pulley 10 is arranged so that its outer periphery comes into contact with the bottoms of the pins 1. As a result, the pins 1 are not pushed inward by the paper 1. In addition because the auxiliary pulley 10 rotates at a speed which is the same as that of the bottoms of the pins 1, frictional forces are not generated between the bottoms of the pins 1 and the auxiliary pulley, and, accordingly, a pitch lag is not generated. Hence, the pins 1 fit smoothly into the holes 12, thereby making it possible to feed the paper in a stable manner.

Although the auxiliary pulley 10 is disclosed as being separate from and independent of the driving pulley 3 in the above-mentioned embodiment, the auxiliary pulley 10 may be integral with the driving pulley 3. Although the auxiliary pulley is provided at the side of the driving pulley 3, it may also be provided at the side of the driven pulley 4, and two auxiliary pulleys may be provided in such a way that one of them is at the side of the driving pulley 3, and the other is at the side of the driven pulley 4.

In accordance with the present invention as mentioned above, because the pins are prevented from being pushed inward by the paper, and pitch lag which is generated by frictional forces is prevented, jamming of the paper is prevented, and it is possible to feed the paper in a stable manner.

We claim:

1. An apparatus for feeding a paper (11) having holes (12), comprising:

a pair of pulley shafts (5);

at least two main pulleys (3, 4) mounted on said pair of pulley shafts;

an endless belt (2) disposed over said two main pulleys;

a plurality of pins (1) mounted on said endless belt and positioned to a side of an outer periphery of said endless belt, said pins fitting into said holes in said paper to feed said paper as said endless belt is driven by said pulleys; and an auxiliary pulley (10) rotatably mounted on one of said shafts, said auxiliary pulley confronting and supporting bottoms of said pins.

2. The apparatus as claimed in claim 1, wherein said auxiliary pulley and one of said main pulleys are integrally formed.

3. The apparatus as claimed in claim 1, wherein said two main pulleys comprise a driving (3) and a driven (4) pulley.

4. The apparatus as claimed in claim 1 wherein said auxiliary pulley is mounted to a side of one of said main pulleys.

5. The apparatus as claimed in claim 1 further comprising a second auxiliary pulley rotatably mounted on the other of said shafts, said second auxiliary pulley also confronting and supporting bottoms of said pins.

* * * * *